US008035739B2

(12) United States Patent
Gerner

(10) Patent No.: US 8,035,739 B2
(45) Date of Patent: Oct. 11, 2011

(54) TRANSMISSION SYSTEM

(75) Inventor: Günter Gerner, Stutensee (DE)

(73) Assignee: Eizo GmbH (DE)

( * ) Notice: Subject to any disclaimer, the term of this patent is extended or adjusted under 35 U.S.C. 154(b) by 1475 days.

(21) Appl. No.: 11/453,603

(22) Filed: Jun. 15, 2006

(65) Prior Publication Data

US 2006/0284828 A1 Dec. 21, 2006

(30) Foreign Application Priority Data

Jun. 16, 2005 (DE) .......................... 10 2005 027 938

(51) Int. Cl.
*H04N 7/01* (2006.01)
*H04N 11/20* (2006.01)

(52) U.S. Cl. ........ 348/441; 348/525; 348/348; 348/531; 348/526; 348/532; 348/527; 348/533; 348/528; 348/534; 348/529; 348/535; 348/530; 348/345; 348/104

(58) Field of Classification Search .................. 348/441, 348/525–535; 345/104
See application file for complete search history.

(56) References Cited

U.S. PATENT DOCUMENTS

| 4,485,401 | A | * | 11/1984 | Tan et al. .................. 348/389.1 |
| 2004/0015991 | A1 | | 1/2004 | Thornton |
| 2007/0127045 | A1 | * | 6/2007 | Burkhardt et al. ............. 358/1.9 |

* cited by examiner

*Primary Examiner* — Brian Yenke
*Assistant Examiner* — Mustafizur Rahman
(74) *Attorney, Agent, or Firm* — Ostrolenk Faber LLP

(57) ABSTRACT

In one aspect a transmission system with a transmitter which can be connected to a video source and a receiver linked to the transmitter via at least four circuit pairs, to which receiver a playback device can be connected is provided. Data is usually exchanged digitally between a graphics card in a personal computer and an LCD display module. The personal computer transmits a digital R, G, B video signal to the LCD display module via a special, so-called DVI (Digital Video Interface) cable. This DVI cable is also provided to transmit so-called DDC (Display Data Channel) data, which particularly comprises specification information of the LCD display module. A transmission system is proposed, which simplifies a connection of an LCD display module to a personal computer and with which the DVI cable can be dispensed with.

9 Claims, 1 Drawing Sheet

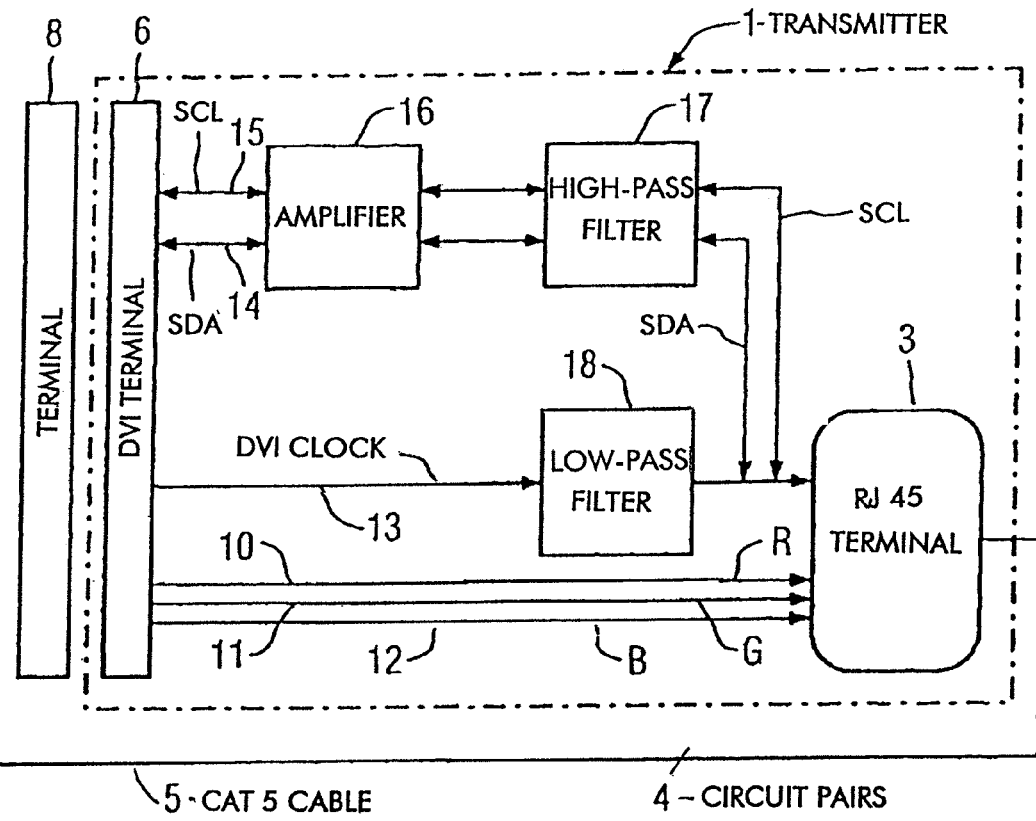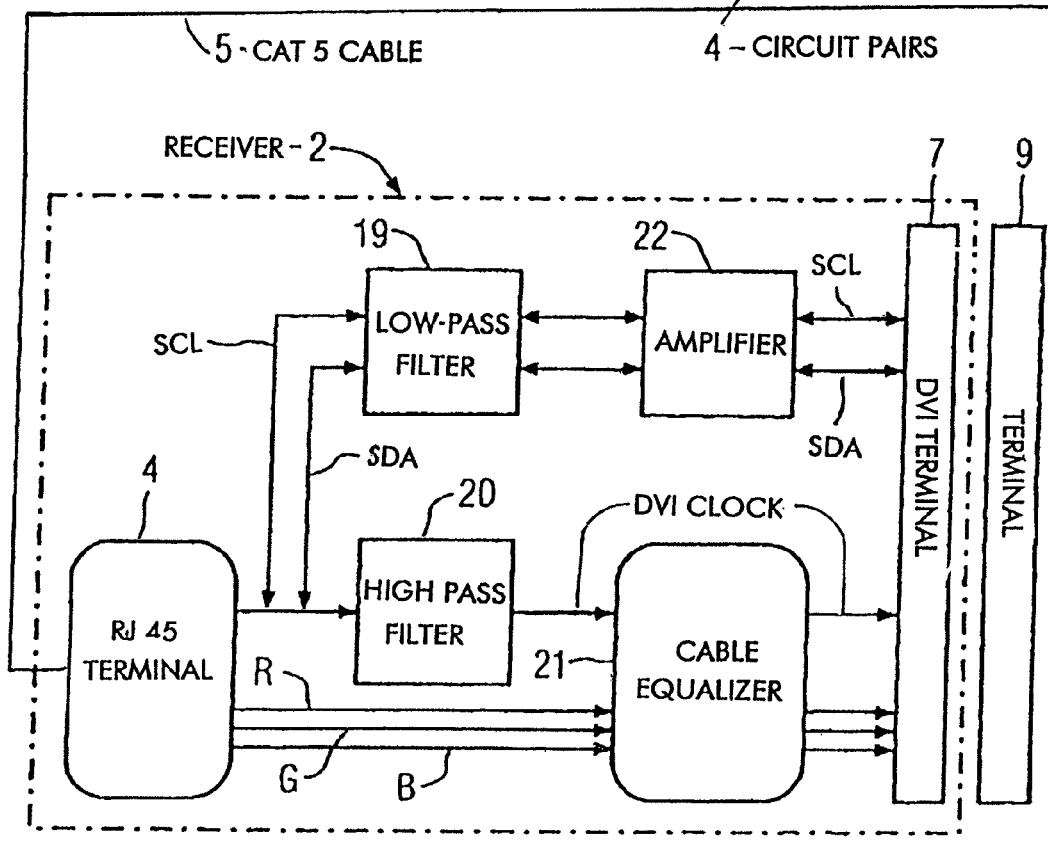

TRANSMISSION SYSTEM

CROSS REFERENCE TO RELATED APPLICATIONS

This application claims priority of German application No. 102005027938.4 DE filed Jun. 16, 2005, which is incorporated by reference herein in its entirety.

FIELD OF INVENTION

The invention relates to a transmission system comprising a transmitter which can be connected to a video source and a receiver linked to the transmitter via at least four circuit pairs, to which receiver a playback device can be connected. Furthermore, the invention relates to a transceiver for a transmission system of this type.

BACKGROUND OF INVENTION

Data is usually exchanged digitally between a graphics card in a personal computer and an LCD display module. The personal computer transfers digital R, G, B video signals to the LCD display module via a special so-called DVI (Digital Video Interface) cable, which comprises a circuit pair for each R, G and B channel. This DVI cable is also provided with further circuit pairs particularly for transmitting a DVI clock signal and for transmitting so-called DDC (Display Data Channel) data. This DDC circuit pair allows the personal computer and the LCD display module to communicate serially, with particularly specification information of the LCD display module, for instance information about data transmission rates, resolution of the LCD display or synchronization frequency, being transmitted via a data line and a DDC clock signal being transmitted via a clock line.

SUMMARY OF INVENTION

Contrary to DVI cables, so-called CAT5 cables are widely used in offices as standard data cables, which are provided to network data processing devices. If both DDC and also digital R, G, B video signals are to be able to be transmitted, it is not possible to use this CAT5 cable to connect an LCD display module to a personal computer.

An object underlying the present invention is to specify a transmission system of the type mentioned at the start, which simplifies a connection of a playback device to a video source. Furthermore, a transceiver is to be specified which is suitable for a transmission system of this type.

This object is achieved with regard to the transmission system, receiver, and transmitter specified by the independent claims.

It is advantageous that a CAT5 data cable comprising four circuit pairs and usually already disposed in offices can be used to connect an LCD display module to a graphics card in a personal computer, with both DDC and also digital R, G, B video signals being able to be transmitted via the economically priced CAT5 cable. The use of an expensive DVI cable can be dispensed with; in contrast the widely used DVI plugs on the playback devices and the video sources can continue to be used.

BRIEF DESCRIPTION OF THE DRAWING

The invention is described in more detail below on the basis of an exemplary embodiment with reference to the sole FIGURE of the drawings. The FIGURE of the drawings shows a transmission system with a transceiver.

DETAILED DESCRIPTION OF INVENTION

A transmitter 1 and a receiver 2 are connected to one another via RJ45 terminals 3, 4 known per se and via a CAT5 cable 5 likewise known per se, which is usually provided to network data processing devices such as devices taking the form of servers, printers or personal computers for instance. The RJ45 terminals 3, 4 are components of devices 1, 2, which are provided in each instance with further terminals in the form of DVI terminals 6, 7 to connect to a video source (not shown here) and to connect to a playback device (similarly not shown here). In the exemplary embodiment displayed, the DVI terminal 6 of the transmitter 1 is actively connected to a terminal 8 of a personal computer corresponding to this DVI terminal 6 and the DVI terminal 7 of the receiver 2 is actively connected to a terminal 9 of an LCD display module corresponding to this DVI terminal 7.

The transmitter 1 comprises three circuit pairs 10, 11, 12 for transmitting digital R, G, B video signals and also a further circuit pair 13 for transmitting a DVI clock signal DVI clock with a first clock frequency, which can lie between 25 MHz and 165 MHz. Furthermore, the transmitter 1 is provided with a DDC (Display Data Channel) data line and a DDC clock line 14, 15, with specification information SDA, for instance information about data transmission rates, resolution of the LCD display or synchronization frequency or information for parameterizing the LCD display module, being transmitted via the data line 14, and a DDC clock signal SCL with a second clock frequency of 100 KHz being transmitted via a clock line 15. The digital R, G, B video signals, the DVI clock signal DVI clock and the DDC data signal and DDC clock signal SDA, SCL are transmitted by a graphics card in the person computer to the transmitter 1. An amplifier 16 amplifies the DDC data signal and DDC clock signal SDA, SCL, with a frequency separating filter comprising a high-pass filter and a low-pass filter 17, 18 superimposing these DDC signals SDA, SCL onto the DVI clock signal DVI clock.

The transmitter 1 transmits the digital R, G, B video signals to the receiver 2 via a circuit pair in each instance, as well as the DVI clock signal DVI clock and the DDC signals SDA, SCL superimposing this DVI clock signal DVI clock via a further circuit pair of the CAT5 cable. The receiver 2 is provided with a frequency separating filter comprising a low-pass filter and a high-pass filter 19, 20, which separate the DDC signals SDA, SCL and the DVI clock signal DVI clock, with the DVI clock signal DVI clock and the digital R, G, B signals being transmitted to the DVI terminal 7 and thus to the corresponding DVI terminal 9 of the LCD display module via a cable equalizer 21 and the DDC signals SDA, SCL being transmitted respectively thereto via an amplifier 22.

The invention claimed is:

1. A transmission system for connecting a playback device to a video source, comprising:
   a transmitter connected to the video source and operable to transmit video signals and information obtained from the video device to the playback device;
   the transmitter further comprising:
   a first circuit pair operable to receive a digital R video signal from video source;
   a second circuit pair operable to receive a digital G video signal from video source;
   a third circuit pair operable to receive a digital B video signal from video source;

a fourth circuit pair operable to receive a first clock signal from the video source;
a first data line operable to receive a second clock signal from the video source;
a second data line operable to receive specification information from the video source; and
a superimposer connected to the first and second data lines and the fourth circuit pair and operable to superimpose the first clock signal, the second clock signal and the specification signal together and to output a superimposed signal on the fourth circuit pair;

a connecting cable operable to carry video signals and information, the connecting cable including a first end and a second end, wherein the first end of the connecting cable is connected to the transmitter;

the connecting cable further comprising:
a first connecting circuit pair connected to the first circuit pair of the transmitter and operable to carry the digital R video signal;
a second connecting circuit pair connected to the second circuit pair of the transmitter and operable to carry the digital G video signal;
a third connecting circuit pair connected to the third circuit pair of the transmitter and operable to carry the digital R video signal; and
a fourth connecting circuit pair connected to the fourth circuit pair of the transmitter and operable to carry the superimposed signal; and a receiver connected to the playback device and the second end of the connecting cable, the receiver operable to receive video signals and information from the transmitter via the connecting cable and provide the video signals and information to the playback device;

the receiver further comprising:
a first receiving circuit pair connected to the first connecting circuit pair and operable to receive the digital R video signal;
a second receiving circuit pair connected to the second connecting circuit pair and operable to receive the digital G video signal;
a third receiving circuit pair connected to the third connecting circuit pair and operable to receive the digital B video signal;
a separator connected to the fourth connecting circuit pair and operable to separate the superimposed signal into the specification signal, the first clock signal and the second clock signal; and
wherein the digital R video signal, digital G video signal, digital B video signal, specification signal, first clock signal and second clock signal are provided to the playback device.

2. The system according to claim 1, wherein a first clock frequency of the first clock signal is between 25 MHz and 165 MHz.

3. The system according to claim 1, wherein a second clock frequency of the second clock signal is 100 KHz.

4. The system according to claim 1, wherein the separator comprises a low-pass filter and a high-pass filter.

5. A transmitter for a transmission system for connecting a playback device to a video source including a connecting cable, the transmitter comprising:
an interface connected to the video source;
a first circuit pair connected to the interface and operable to receive a digital R video signal from video source;
a second circuit pair connected to the interface and operable to receive a digital G video signal from video source;
a third circuit pair connected to the interface and operable to receive a digital B video signal from video source;
a fourth circuit pair connected to the interface and operable to receive a first clock signal from the video source;
a first data line connected to the interface and operable to receive a second clock signal from the video source;
a second data line connected to the interface and operable to receive specification information from the video source; and
a superimposer connected to the first and second data lines and the fourth circuit pair and operable to superimpose the first clock signal, the second clock signal and the specification signal together and to output the superimposed signal on the fourth circuit pair;
wherein the first circuit pair, the second circuit pair, the third circuit pair and the fourth circuit pair are connected to the connecting cable to provide the digital R video signal, digital G video signal, digital B video signal and superimposed signal to the connecting cable.

6. The transmitter according to claim 5, wherein a first clock frequency of the first clock signal is between 25 MHz and 165 MHz.

7. The transmitter according to claim 5, wherein a second clock frequency of the second clock signal is 100 KHz.

8. A receiver for a transmission system for connecting a playback device to a video source including a connecting cable, the receiver comprising:
a first receiving circuit pair connected to the connecting cable and operable to receive a digital R video signal;
a second receiving circuit pair connected to the connecting cable and operable to receive a digital R video signal;
a third receiving circuit pair connected to the connecting cable and operable to receive the digital G video signal;
a separating filter connected to the connecting cable and operable to receive a superimposed signal and to separate the superimposed signal into a specification signal, a first clock signal and a second clock signal; and
an interface connecting the receiver to the playback device, wherein the digital R video signal, digital G video signal, digital B video signal, specification signal, first clock signal and second clock signal are provided to the interface.

9. The system according to claim 8, wherein the separating filter comprises a low-pass filter and a high-pass filter.

* * * * *